United States Patent [19]

Trachtenburg et al.

[11] E Re. 30,930

[45] Reissued May 18, 1982

[54] GLAZING STRIP AND METHOD

[76] Inventors: Martin Trachtenburg, 14 Candlewood La., Avon, Conn. 06001; Robert H. Sand, 20 Trailsend Dr., Canton, Conn. 06019

[21] Appl. No.: 164,155

[22] Filed: Jun. 30, 1980

Related U.S. Patent Documents

Reissue of:

[64] Patent No.: 4,138,807
Issued: Feb. 13, 1979
Appl. No.: 891,908
Filed: Mar. 30, 1978

[51] Int. Cl.[3] ..... E06B 3/56

[52] U.S. Cl. ..... 52/309.3; 52/394; 52/743; 206/813

[58] Field of Search ..... 52/309.3, 309.5, 220, 52/288, 173, 394, 400, 743, 744, 716, 749; 206/813, 820; 428/40

[56] References Cited

U.S. PATENT DOCUMENTS

| | | | |
|---|---|---|---|
| 778,742 | 12/1904 | Conner et al. | 206/813 X |
| 2,292,394 | 8/1942 | O'Brien | 52/716 X |
| 2,451,194 | 10/1948 | Braun | 206/813 X |
| 3,271,232 | 9/1966 | Moore | 52/288 X |
| 3,337,040 | 8/1967 | Brace | 206/820 X |
| 3,408,250 | 10/1968 | Finefrock | 52/288 X |
| 3,616,587 | 11/1971 | Schlafly | 52/288 |
| 3,707,061 | 12/1972 | Collette et al. | 52/288 |

FOREIGN PATENT DOCUMENTS

| | | | |
|---|---|---|---|
| 110488 | 4/1964 | Czechoslovakia | 52/220 |

*Primary Examiner*—J. Karl Bell
*Attorney, Agent, or Firm*—McCormick, Paulding & Huber

[57] ABSTRACT

A glazing strip of extruded polyvinyl chloride plastic or the like has a cross sectional shape such that a glazing putty can be provided in a central cavity for subsequent use by the installer. When used to glaze a window pane in a sash this strip is cut to length from a roll or the like, and a wax paper or the like is removed from mutually perpendicular lands on the plastic strip to uncover pressure sensitive adhesive areas on these lands. The lands serve to hold the strip to the sash, and to the glass pane, while the strip is squeezed by means of a roller or blunt tool or spatula, or one's fingers to cause the putty or caulking compound to issue from a slot provided for this purpose in the underside of the plastic strip. The putty is thereby urged from the cavity into an L-shaped space between the strip and the window sash and pane such that a positive seal is provided for the window pane to hold it in place in the sash.

12 Claims, 3 Drawing Figures

GLAZING STRIP AND METHOD

Matter enclosed in heavy brackets [ ] appears in the original patent but forms no part of this reissue specification; matter printed in italics indicates the additions made by reissue.

SUMMARY OF INVENTION

This invention relates generally to glazing window glass for wood or metal window sash and deals more particularly with an improved plastic glazing strip, having putty or equivalent compound for caulking the window glass, provided in the plastic strip itself.

The plastic strip is preferably made from a polyvinyl chloride material and has an internal cavity for storing the putty or caulking compound. Mutually perpendicular lands are provided with a pressure sensitive adhesive material, which lands are covered by a wax paper or the like until the material is cut to proper length for use. The paper also covers a slot in the underside of the plastic strip such that the putty is held in this cavity until pressure is applied to the outer surface of the plastic strip to cause the putty to issue through the slot and to fill an L-shaped cavity or recess defined between the underside of the strip and the window sash. The geometry of the plastic strip is preferably such that it has a symmetrical cross section and the lands are adapted to contact the window sash and the window pane such that an L-shaped recess or crevice is provided for receiving the putty or caulking compound forced from the internal cavity of the strip during installation of the improved glazing strip with a window sash. A mechanical roller or blunt tool or spatula or one's fingers may be utilized to exert the required pressure on the strip in order to open the slot slightly so that the putty material is mechanically forced from the internal cavity defined for this purpose in the plastic strip and into the L-shaped recess defined between the underside of the strip and the window sash and its associated glass window pane.

The primary purpose of the present invention is to provide an improved glazing strip which will permit the installation of a glass window pane in a window sash without the necessity for handling and otherwise applying putty or caulking compound in order to hold the glass window pane in place.

DETAILED DESCRIPTION

Figure 1:
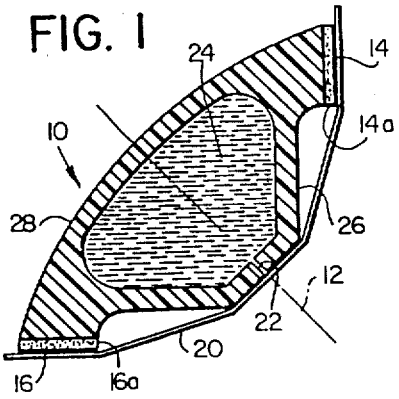
FIG. 1 is a sectional view through the plastic glazing strip of the present invention as the strip is designed to be supplied by the maker thereof, and before such strip is cut and applied to a window sash.

Turning now to the drawing in greater detail, FIG. 1 shows an extruded strip of polyvinyl chloride 10 having a shape or cross section suitable for use in carrying out the present invention. As shown, the strip is generally symmmetrical about the plane or line 12, but such is not necessary to the broadest aspects of the present invention, and this symmetrical shape is adopted primarily for the convenience of the installer. The strip 10 has longitudinally extending lands 14 and 16 symmetrically arranged with respect to the plane of symmetry 12, and oriented at right angles to one another as shown in FIG. 1, such that the strip can be placed in a window sash 18 (best shown in FIG. 2) in carrying out the method of the present invention. Each of these lands 14 and 16 carries a pressure sensitive adhesive material 14a and 16a respectively which pressure sensitive adhesive material is covered with a protective paper strip 20, as best shown in FIG. 1. This paper 20 is preferably wax covered so as not to be adversely affected by the adhesive applied to these lands 14 and 16 and a center portion of the strip 20 covers a longitudinally extending slot or opening means best shown at 22 in FIGS. 1 and 2.

The strip 10 preferably comprises a carrier for storing a quantity of semi-liquid putty or caulking compound 24 provided in a central cavity defined for this purpose in the extruded plastic strip 10. The inner wall 26 of this central cavity for the putty 24 preferably has such thickness that the wall 26 is resilient or flexible, and adapted to move sufficiently so that the slot 22 can be opened from the relatively closed position illustrated in FIG. 1 to the slightly open position illustrated for it in FIG. 2. In order to achieve this flexibility for the inner wall 26 the outer wall 28 of the plastic strip, forming the outer wall of the central cavity for the putty 24 is also made of such thickness that it too is flexible and adapted to being mechanically compressed from the convex configuration shown for it in FIG. 1, to the flattened configuration shown in FIG. 2, in order to further facilitate the opening of the slot 22 as described above.

Figure 2:
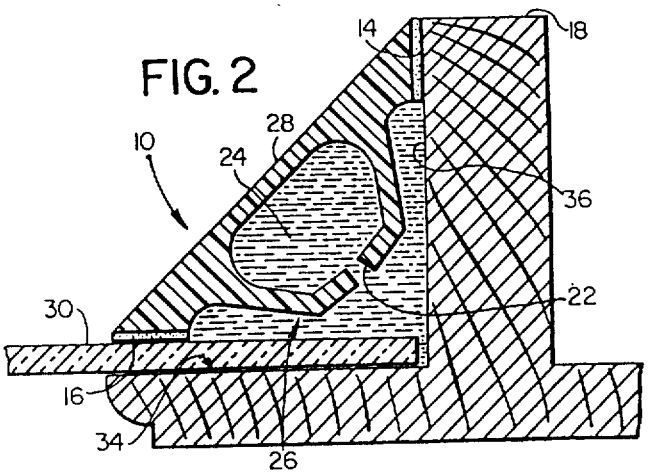
FIG. 2 is a vertical sectional view generally similar to FIG. 1 but showing the strip after it has been applied to a window sash in accordance with the method of the present invention.

As best shown in FIG. 2, the plastic strip 10, with its associated putty filled cavity, is adapted to cooperate with the window sash 18 and the window pane 30 to define a generally L-shaped space or recess into which space some of the glazing compound or putty can be urged as a result of external pressure applied to the outer cavity wall 28. As a result of applying such pressure to the wall 28 of the plastic strip 10, the overall volume of the cavity filled with the putty 24 will be reduced, and consequently the putty or caulking compound will be forced outwardly through the slot 22 into this L-shaped space. The consistency of this putty material is such that it, in combination with the pressure sensitive adhesive coated lands 14 and 16, serve to hold the plastic strip 10 in the "flattened" configuration shown in FIG. 2 after this pressure applying step of the present invention has been achieved. Thus, the plastic strip 10 has an initial convex external contour as best shown in FIG. 1, which contour is adapted to be flattened, as for example by the roller 32 shown in FIG. 3, in order to flatten the external surface 28 of the strip and cause the internal volume of the cavity 24 to be decreased, opening the slot 22, and achieving transfer of the putty material 24 from the cavity into the L-shaped space defined between the plastic strip 10 and the window sash 18 and glass window pane 30 as shown in FIG. 2.

Figure 3:
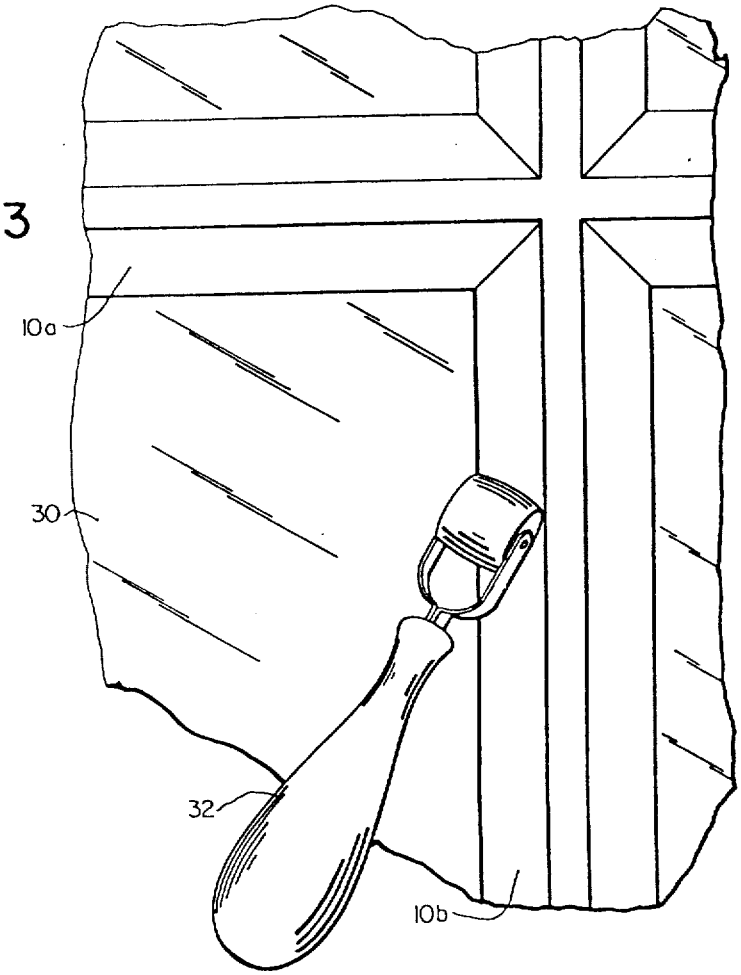
FIG. 3 is a plan view of the window sash shown in FIG. 2 illustrating a mechanical roller for accomplishing the step of forcing putty from the internal cavity of the plastic strip into the L-shaped space or recess defined between the inside of the plastic strip and the window sash in order to hold a glass window pane in place in an associated wood window sash or frame.

The method of the present invention has been alluded to in the preceeding description of the plastic strip and its associated putty material 24. However, for the purpose of clarity, and to better appreciate the scope of the present invention, it is noted that the window sash 18 is of conventional construction having conventional glass edge supporting surfaces 34 together with mutually perpendicular sash side surfaces 36 located adjacent to one another. These mutually perpendicular surfaces are adapted to receive the pressure sensitive adhesive areas 14a and 16a as best shown in FIG. 2. The plastic carrier strip 10 is provided on a roll, or is otherwise stored in a convenient manner so as to be conveniently cut to length with the ends mitered as shown in FIG. 3, so that segments of this plastic strip can be laid into the sash openings over the glass pane 30 as best shown in FIG. 3. The wax paper 20 will have been removed prior to insertion of these segments 10a and 10b and after insertion, a roller 32 is preferably used to apply pressure to the outer surface of these carrier strip segments to urge the glazing compound or putty out of the central cavity defined in the plastic strip segments so that this putty finds its way into the L-shaped space, best shown in FIG. 2, defined between the inside surface of the plastic strip segment 26 and the sash surfaces 34 and 36. This invention provides a convenient means for assembling window panes in a wood window sash of conventional configuration without the necessity for skilled manipulation of putty or caulking compound and will be seen to be a marked improvement over present day production techniques, as well as to facilitate the replacement or repair of broken window panes in wood [wind] *window* sash generally.

We claim:

1. A glazing strip for window sash, comprising an extruded thermoplastic carrier member having longitudinally extending lands oriented at right angles to one another and located adjacent the marginal edges thereof, pressure sensitive adhesive applied to said lands, said carrier defining a longitudinally extending central cavity with inner and outer walls having such thickness that they are flexible, glazing compound contained in said cavity, said inner cavity wall defining opening means for said glazing compound, and said inner cavity wall extending between said lands and adapted to cooperate with the window sash to define a generally L-shaped space into which space some of said glazing compound can be urged by external mechanical pressure applied to said outer cavity wall.

2. The combination defined by claim 1 further characterized by a removable strip covering said lands and said opening means.

3. The combination defined by claim 1 wherein said extruded thermoplastic carrier is fabricated from a resilient material such as polyvinyl chloride.

4. The combination defined by claim 1 wherein said carrier has a slightly convex outer surface which can be flattened by mechanical pressure applied as aforesaid to urge said glazing compound outwardly through said opening means as aforesaid.

5. The combination defined by claim 4 wherein said opening means comprises an elongated slot in said cavity inner wall such that mechanical pressure applied to said convex outer surface widens said slot to facilitate the transfer of glazing compound from said internal carrier cavity into said L-shaped space.

6. The method of glazing a plane of window glass in a window sash opening wherein the sash defines conventional glass edge supporting surfaces and sash side surfaces at right angles thereto, said method comprising the steps of:

(a) providing glazing carrier strip material of the type defined in claim 1, (b) cutting segments of said strip to appropriate length for fitting into the sash openings over the glass, (c) applying pressure to the outer surface of said carrier to urge the glazing compound out of said cavity into the L-shaped space.

7. The method of claim 6 wherein said step of providing the strip of claim 1 more particularly comprises providing the strip of claim 2, and wherein said step of applying pressure to said strip is preceded by the removal of said covering strip.

8. The method of claim 7 wherein said step of applying pressure comprises manually pressing the carrier with a tool of convex contour to provide sufficient mechanical pressure on the carrier cavity outer wall to open a slot in said inner cavity wall and force sufficient glazing compound from the cavity and into the L-shaped space to fill the latter.

*9. A glazing strip for application to a corner structure or the like comprising:*

*(a) an elongated thermoplastic carrier member having longitudinally extending lands oriented at right angles to one another and located adjacent the marginal edges thereof,*

*(b) pressure sensitive adhesive applied to said lands,*

*(c) said carrier member defining a longitudinally extending central cavity with inner and outer walls having such thickness that they are flexible,*

*(d) glazing compound contained in said cavity,*

*(e) said inner cavity wall defining opening means for said glazing compound,*

*(f) said inner cavity wall adapted to cooperate with the corner structure to define a space into which some of said glazing compound can be urged by external mechanical pressure applied to said outer cavity wall.*

*10. The combination defined by claim 9 further characterized by a removable strip covering said lands and said opening means.*

*11. The combination defined by claim 9 wherein said carrier has a slightly convex outer surface which can be flattened by mechanical pressure applied as aforesaid to urge said glazing compound outwardly through said opening means as aforesaid.*

*12. The method of glazing comprising:*

*(a) providing a glazing strip of the type defined by claim 9,*

*(b) cutting segments to appropriate length,*

*(c) applying pressure to the outer surface of said cavity to urge some of the glazing compound out of said cavity into said space.*

* * * * *